United States Patent
Kirma et al.

[11] Patent Number: 6,126,483
[45] Date of Patent: Oct. 3, 2000

[54] INTERCONNECT SYSTEM FOR HEATING CONDUCTORS IN AN AIRCRAFT

[75] Inventors: Safa Kirma, Wedel; Heinz Stoever, Stade; Joachim Pfeiff, Neuwulmsdorf; Wolfgang Erdmann, Buxtehude, all of Germany

[73] Assignee: DaimlerChrysler Aerospace Airbus GmbH, Hamburg, Germany

[21] Appl. No.: 09/103,120

[22] Filed: Jun. 23, 1998

[30] Foreign Application Priority Data

Jun. 23, 1997 [DE] Germany ............... 197 26 419

[51] Int. Cl.⁷ .................................................. H01R 13/40
[52] U.S. Cl. ........................................... 439/587; 219/541
[58] Field of Search ......................... 439/587, 490, 439/372, 355, 356, 281; 219/517, 528, 535, 541, 549

[56] References Cited

U.S. PATENT DOCUMENTS

| | | |
|---|---|---|
| 3,341,690 | 9/1967 | Commins . |
| 4,066,870 | 1/1978 | Colten . |
| 4,101,190 | 7/1978 | Schoff . |
| 4,419,569 | 12/1983 | Colten . |
| 4,639,066 | 1/1987 | Shimamiya et al. . |
| 5,510,405 | 4/1996 | Heucher et al. . |

FOREIGN PATENT DOCUMENTS

| | | |
|---|---|---|
| 0187636 | 7/1986 | European Pat. Off. . |
| 1056221 | 12/1961 | Germany . |
| 1893605 | of 1964 | Germany . |
| 04019 | 5/1985 | Germany . |
| 03674 | 6/1985 | Germany . |
| 4338699 | 2/1995 | Germany . |

OTHER PUBLICATIONS

Excerpt of Product Catalog: "Products for Freeze Protection", Wittmann GmbH, Heidelberg, Germany.
Excerpt of Product Catalog: "Heizelemente und Widerstände", p. 17, friedr.freek GmbH.
Excerpt of Product Catalog: "bringt Wärme auf den Punkt bis 1000°C—optimal dosiert—für Industrie und Labor", Wittmann GmbH, Heidelberg, Germany.
Excerpt of Product Catalog: "The Bartec Group".

*Primary Examiner*—Renee Luebke
*Assistant Examiner*—Antoine Ngandjui
*Attorney, Agent, or Firm*—W. F. Fasse; W. G. Fasse

[57] ABSTRACT

A system of interconnected heating conductors, suitable for preventing freezing of water lines in an aircraft for example, includes a plurality of heater units (1, 12) electrically coupled together by respective coupling plugs (9, 10). Each heater unit comprises one or more heating conductor bands or cables (2, 21, 22), with a respective socket contact plug (9) connected to one end thereof and a respective pin contact plug (10) connected to the other end thereof. Each plug (9, 10) includes a housing (6) wherein the conductors of the heater band (2) are crimp-connected to electrical connectors (7), which include pin contacts (723) in the case of the pin contact plug (10) and socket contacts (77) in the case of the socket contact plug (9). The housing (6) is completely filled with a sealing compound (19) which is injected through a fill hole in the housing wall. The pin contacts (723) extend outwardly through contact chambers into a female cavity (411) of the plug (10), while the socket contacts (77) extend outwardly through contact chambers in a male plug member (412) of the plug (9). The two plugs may be matingly plugged together, and mechanically secured by locking bails (23) engaging retaining catches (24). This achieves a very effective seal against moisture penetration, and eliminates capillary action even when subjected to vibrations, shock, temperature variations, and low pressure conditions.

31 Claims, 2 Drawing Sheets

INTERCONNECT SYSTEM FOR HEATING CONDUCTORS IN AN AIRCRAFT

CROSS-REFERENCE TO RELATED APPLICATION

This application is related to the U.S. application Ser. No. 09/103,123 of the same inventors, entitled "INTERCONNECT SYSTEM FOR HEATING CONDUCTORS", filed on Jun. 23, 1998, now U.S. Pat. No. 5,998,772, issued Dec. 7, 1999. The entire disclosure of the copending application is incorporated by reference herein.

PRIORITY CLAIM

This application is based on and claims the priority under 35 U.S.C. §119 of German Patent Application 197 26 419.0, filed on Jun. 23, 1997. The entire disclosure of German Patent Application 197 26 419.0 is incorporated herein by reference.

FIELD OF THE INVENTION

The invention relates to a system for interconnecting heating conductors such as heater bands, cables, tapes or strips, including a plurality of heating conductor arrangements that are electrically coupled together by means of respective electrical coupling elements, especially in an aircraft.

BACKGROUND INFORMATION

Modern aircraft include various different systems of pipes, conduits, instruments, and accessories in which various liquid products are transported. These liquid-containing components are subject to freezing temperatures during the operation of the aircraft. Therefore, it has become generally known to apply interconnected heater bands, cables, tapes, or strips (generally called heater bands herein) onto these liquid-containing components to provide frost protection. The interconnected heater bands form a heating conductor interconnection system, which is provided with electrical energy from the on-board electrical power network of the aircraft.

The known techniques for interconnecting the several heater bands involve carrying out various prescribed steps to prepare and connect the connection ends of the individual heater bands to further heater bands or to the on-board power supply network. These steps typically involve exposing the electrical conductors of the heater band by at least partially stripping the outer and inner sheaths thereof, whereby the heater element itself is made correspondingly shorter. Generally, the conductors have a length sufficient to serve as extension cables for interconnecting several heating conductors as desired. Next, an adhesive potting or sealing compound is applied over the insulation of the conductors, and then a shrinkable tubing is pushed over the insulation of the conductors and the adhesive potting compound. After the shrinkable tubing is adhesively bonded onto this structure and the adhesive potting compound has cured, the shrinkable tubing insulates and seals the transition between the conductors and the heating element at the offset or shouldered end of the inner sheath, i.e. the portion of the conductor from which the insulating sheathing has been stripped off.

The conductors may include respective braided protective or shielding conductors that are arranged to lie over the inner sheath, but that have a length shorter than the current-carrying conductors. By subsequent measures, the ends of the strands of the protective conductor braid are combed out and twisted. Then a crimpable butt connector is used to electrically connect the twisted free end of the protective conductor braid to an additional extension conductor, by being crimped onto these two components. This additional extension conductor has a length extending to the ends of the current-carrying conductors of the heater band, and respective pin contacts are crimped onto the free ends of these respectively insulated conductors.

Next, a shrinkable tubing is shrunk over the electrical conductors, and then an adhesive potting compound is applied outside around the shrinkable tubing, over the transition area of the protective conductor braid at the location where the outer sheath has been removed from the heater band. The resulting structure is further covered by an additional shrinkable tubing that is shrunk into position thereon. The additional shrinkable tubing is adhesively bonded onto the underlying layered structure, and the adhesive potting compound is cured, whereby the additional shrinkable tubing then insulates the above described heater band interconnection at the offset or shouldered end of the outer sheath of the heater band. The heater band interconnection that is prepared in the above manner ensures that the prescribed sealing requirements in the field of aircraft construction are achieved.

Then, the heater bands are electrically connected to each other and/or to the electrical power supply network of the aircraft as follows. First, the pin contacts that were crimped onto the free ends of the electrical conductors and onto the additional extension conductors that were connected to the protective conductor braid, are then separately inserted or plugged into respective through-connect sockets. Thereby, all of the electrical connections of the heater bands to each other and to the on-board power supply network are realized by means of the through-connect sockets.

The heater band interconnection carried out in the above described manner results in a non-uniform and unwieldy geometry and involves several applications of an adhesive potting compound and plural shrinkable tubes forming sheaths. The process for forming the connection is rather complicated and time consuming because the connection structure is formed by manually applying the adhesive potting compound, and then fitting several shrinkable tubes thereon, and finally individually drying and curing each adhesive potting compound layer separately in an oven. There is also a danger that a uniform and constant quality cannot be achieved over a series of connections, whereby the sealing properties may be negatively influenced at the extreme low pressure conditions and drastic temperature variations that prevail in the aircraft. Moreover, a danger exists that the applied shrinkable tubes may crack or tear at various offset or shouldered or stepped locations of the non-uniform geometry. In that case, the sealing of the heater band interconnection, as well as the reliability of the heater band overall, will consequently be negatively influenced, whereby the power supply reliability of an entire integrated heating conductor interconnection system can be jeopardized.

Moreover, the above described conventional technology suffers the disadvantage that the electrical conductors of the heater band, without the protective conductor braid, are functionally laid out as extension conductors. Only the protective conductor braid is connected to an additional lengthening extension conductor by means of butt connectors. In this context, the conductors must be embodied to have the proper length, e.g. be cut to the proper length, and be insulated at each one of the connections.

The above described conventional measures require a considerable amount of time, effort and expense. Moreover, the danger exists that one or more strands of the conductor will be damaged, and the surface protection can be damaged. The manual application of the adhesive potting compound onto the conductors and the subsequent sliding or pushing of the shrinkable tubes onto the arrangement also add to the technological effort and expense. The application of the adhesive potting compound is absolutely indispensable for adhesively bonding the shrinkable tubes for ensuring the sealing effectiveness and for avoiding the possibility of capillary action. As a further disadvantage, the electrical assembly of the protective conductor braid and the additional extension conductor by means of a respective butt connector does not exactly define the position and the integration of this assembly within the heater band connection. Therefore, and since the butt connector includes a through-going axial hole, it is not possible to avoid a complete or 100% capillary action through the crimped butt connector.

The multiple drying and curing steps required by the adhesive potting compound for adhesively bonding the shrinkable tubes by means of heating in an oven further add to the technical complexity, effort and expense. Moreover, the heater element itself and the associated electrical conductors must be individually and collectively adhesively bonded and sealed with respective shrinkable tubes. A final heat treatment for an additional outer shrinkable tube or sheath, which provides additional sealing and the outer mechanical protection of the prepared heater band connection, further considerably increases the technological effort and expense.

For the above reasons, heater band connections cannot be economically and practically produced according to the methods and arrangements of the prior art. Moreover, the heater bands to be installed in an aircraft cannot be economically pre-fabricated according to the above described state of the art.

SUMMARY OF THE INVENTION

In view of the above, it is an object of the invention to provide an interconnection system for heating conductors, especially in an aircraft, of the above described general type, but improved in such a manner that the structural arrangement and the fabrication technique can be simplified, while simultaneously achieving an improved sealing effectiveness and eliminating capillary action in the connections, even under the influence of vibrations, shock, temperature alternations, and low pressure conditions, to which the heating conductor interconnection system may be subjected in its installation in an aircraft. It is also an aim of the invention to provide a heating conductor interconnection system that is suitable or adaptable to other non-aircraft applications where it is necessary to thermally protect temperature sensitive systems, such as for providing frost protection and product heating. The invention further aims to provide temporary or removable heating conductor interconnections.

Plural heating conductor arrangements are to be simply integrateable to form a heating conductor interconnection system, whereby the individual heating conductor arrangements are to be economically manufacturable, easily installable, and also easily replaceable if it later becomes necessary in the completed heating conductor interconnection system. Also, the yield rate shall be increased and the reject rate shall be reduced to a minimum in the production of the heating conductor interconnection system. The invention further aims to avoid or overcome the other disadvantages of the prior art, and to achieve additional advantages, as apparent from the present description.

The above objects have been achieved in a system of interconnected heating conductors according to the invention, especially in an aircraft, wherein the system includes at least first and second heating conductor arrangements that are electrically and mechanically coupled together by means of respective electrical coupling elements. The first heating conductor arrangement includes a first heater band and a pin contact plug connected thereto. The second heating conductor arrangement includes a second heater band and a socket contact plug connected thereto. The heating conductor arrangements and particularly the pin contact plug and the socket contact plug are so arranged and adapted that the pin contact plug can be plugged into the socket contact plug so as to form an electrical coupling between the two heating conductor arrangements. Furthermore, the pin contact plug and the socket contact plug can be mechanically locked together.

According to preferred details of the invention, each heating conductor arrangement includes a pin contact plug at one end thereof and a socket contact plug at the other end thereof, and each one of the contact plugs comprises a connection housing enclosing an inner chamber therein, with at least one lead-in opening passing through a housing wall of the housing into the inner chamber, and at least one electrical connecting element arranged within the inner chamber. The heater band passes through the lead-in opening into the inner chamber. Each heater band includes at least one electrical conductor covered by at least one insulating sheath, which is stripped off to expose a connection end of the respective conductor, which is connected to the connection element, for example by crimping the connection element onto the exposed end of the conductor. A sealing compound entirely fills the inner chamber of the housing and seals the connection region, i.e. the area at which the heater band conductor is connected to the connecting element.

By using the plug housings, it is a simple matter to make the electrical connections within the housing and then simply fill the housing with a sealing compound after the connections have been made. In this manner, a very effective seal is achieved, and the individual steps of manually applying sealant to several independent connections and applying multiple shrinkable tubes and the like can be avoided. Also, by providing the plugs, it is a simple matter to interconnect any desired number of the modular heating conductor arrangements to form a heater system of the size and configuration needed for any particular application.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

A heating conductor interconnection system can be installed in an aircraft to provide prophylactic freeze protection and product heating, of frost endangered pipes or conduit systems and their related accessories. Such a heating cable system is particularly applicable, for example, for heating the fresh water supply system and the waste water drain system to prevent freezing of the water therein. The heating conductor interconnection system is embodied in such a manner that any defective or failing individual section or component thereof may simply and without problems be removed from the system and be replaced by a properly functioning component.

Figure 1:
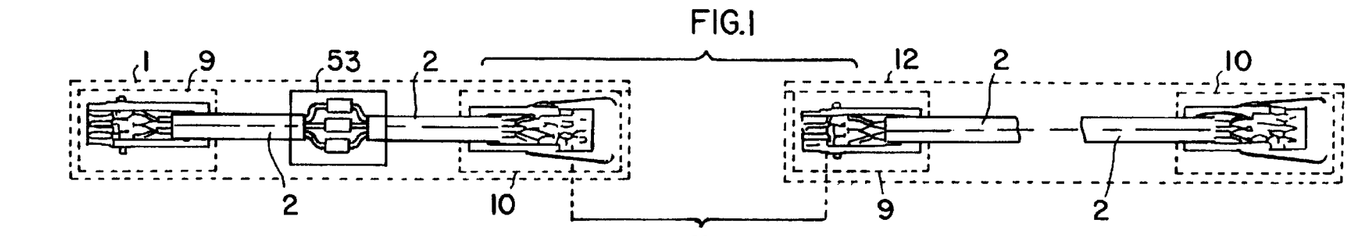
FIG. 1 shows a schematic overview of a heating conductor interconnection system according to the invention, including two electrically couplable heating conductor arrangements.

The heating conductor interconnection system as shown in FIG. 1 includes a first heating conductor arrangement or heater unit 1 and a second heating conductor arrangement or heater unit 12, which are arranged end-to-end adjacent one another and may be electrically coupled and mechanically locked together in a coupling region 41, by means of suitable coupling elements provided at the respective ends of the individual heating conductor arrangements 1 and 12. More specifically, the first heating conductor arrangement 1 includes a respective heater cable or heater band 2 with a pin contact plug 10 connected permanently to an end thereof, while the second heating conductor arrangement 12 includes a respective heater band 2 with a socket contact plug 9 connected permanently to an end thereof. The pin contact plug 10 and socket contact plug 9 are adapted to be plugged and mated together to form the coupling region 41 between the two heating conductor arrangements 1 and 12.

Figure 4:
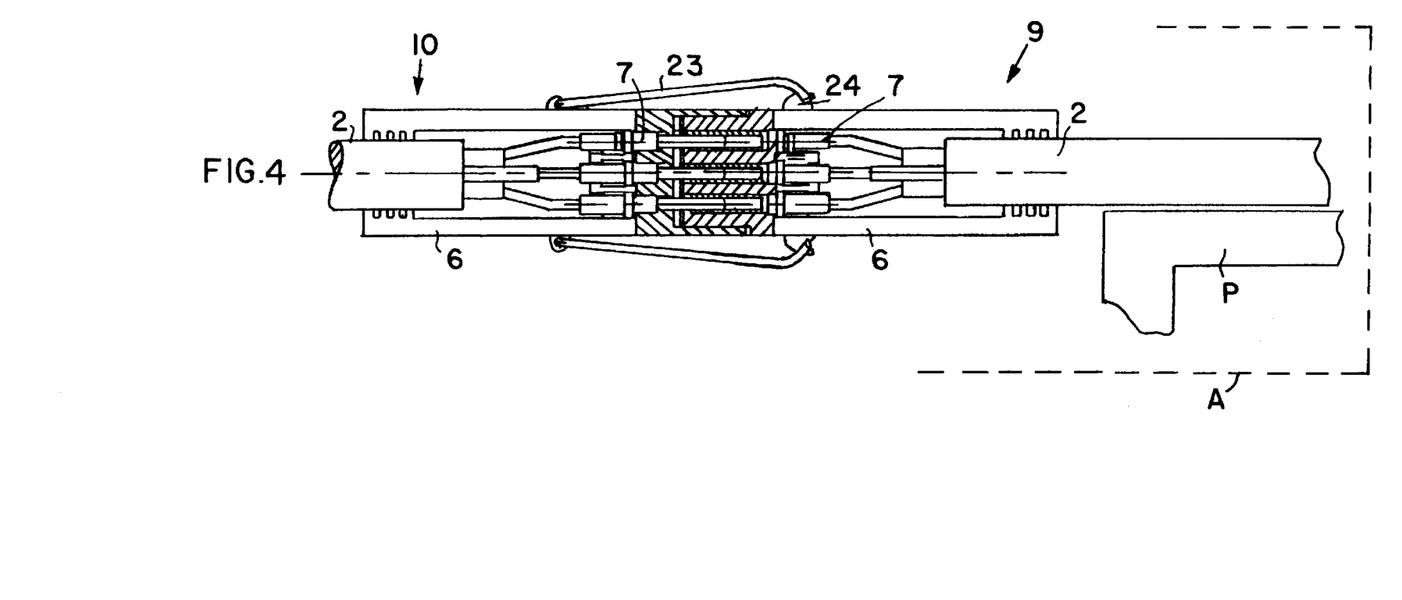
FIG. 4 shows the pin contact plug and the socket contact plug electrically coupled and mechanically locked together, with the heater arrangement mounted on a pipe system in an aircraft as shown schematically.

The details of the construction and arrangement of the components will be described below. It should first be noted in general terms, that the present system or arrangement allows any desired number of heating conductor arrangements 1, 12 up to a given nth heating conductor arrangement, to be serially coupled together, end-to-end, especially if each heating conductor arrangement includes a pin contact plug 10 at one end thereof and a socket contact plug 9 at the opposite end thereof. This series connection of N heating conductor arrangements forms a heating conductor chain having the desired length and configuration for any particular installation. The heater bands 2 of the respective heating conductor arrangements 1, 12 up to the Nth heating conductor arrangement are then, for example, secured to the pipes or conduit lines P of the fresh water or waste water system that is to be heated in the aircraft A as schematically represented in FIG. 4.

The last or Nth heating conductor arrangement in such a chain may include only a single contact plug on one end thereof, while the opposite end thereof is a terminal or free end of the heating conductor chain, which does not need to be further coupled to any subsequent heating conductor arrangement. In other words, the last or Nth heating conductor arrangement in a given heating conductor chain includes only one coupling element that is connected to the coupling element of the preceding or N—1th heating conductor arrangement. The free or terminal end of the heater band 2 of the Nth heating conductor arrangement is not provided with a coupling element, but is instead provided with a heater band end cap. The electrical conductors of this heater band 2 at the terminal end of the heater band chain are not connected to each other by or at the heater band end cap, but rather are electrically insulated from each other and surrounded or enclosed by an adhesive potting compound 19. By these means, the free end of the heater band 2 is completely sealed against the penetration of moisture or liquid, even under conditions of extreme low pressure, e.g. substantially below atmospheric pressure, in order to ensure that all of the sealing requirements are met.

The very first heating conductor arrangement within a heating conductor chain, similarly to the last or Nth heating conductor arrangement, only comprises a single coupling element, i.e. a socket or pin contact plug 9 or 10, at one end thereof, for coupling with the subsequent or second heating conductor arrangement. On the opposite or first free end thereof, the first heating conductor arrangement includes any type of connector appropriate for connecting the heating conductor chain to the on-board power supply network of the aircraft, for supplying electrical energy to the heating conductor chain. For example, the beginning free end of the first heating conductor arrangement may be provided with a respective one of the same socket or pin contact plugs 9 or 10 as are provided on the ends of all of the standard modular heating conductor arrangements. A mating plug is connected to the on-board power supply network of the air-craft, either directly or by means of a suitable extension cable. The one or more conductors of the on-board power supply network or of the corresponding extension cable are passed through respective housing lead-in openings 64 into the housing 6 of the plug 9 or 10, and exposed connection ends thereof are connected to electrical connecting elements 7 provided in the coupling element. Then, the plug, or simple pin contacts provided on the end of the first heating conductor arrangement can be plugged into the coupling element connected to the on-board power supply network. Alternatively, a simple through-connect socket may be used, to connect pins provided on the heating conductor arrangement with pins provided on the power supply network.

It should further be understood that each heating conductor arrangement 1, 12, in and of itself, may include a plurality of the heater bands 2 or heater band sections interconnected together, permanently or disconnectably (by plugs), by respective intermediate connection modules that are respectively arranged and connected between each two adjacent heater bands. The free input and output ends of the heater bands at the respective ends of the heating conductor arrangement are permanently connected to coupling elements such as the pin contact plug and socket contact plug as described herein.

Such an embodiment of a heating conductor arrangement is especially useful and interesting in the event it becomes necessary to repair a heating band 2 suffering an electrical failure such as a short-circuit, or a mechanical damage. In that case, the damaged or failing portion of the heater band 2 can be localized over the length of the installed heater band, and the damaged portion can simply be cut out of the heater band 2, whereby two shorter heater band sections will remain on either side of the cut-out portion. These two shorter heater band sections can then be connected to each other by means of a respective intermediate connection module 53 as schematically shown in the heating conductor arrangement 1 in FIG. 1. In this manner, it is relatively simple to repair a damaged or malfunctioning heater band 2 even while it remains installed in its ordinary position, by simply replacing the damaged portion of the heater band with a respective intermediate connection module, which may have a construction similar to the respective plugs 9 and 10, including a housing that has electrical connectors therein and that is filled with a sealing compound, or which may comprise two of the respective plugs 9 and 10 plugged together.

As shown in FIG. 1, each heating conductor arrangement 1 and 12 has exactly the same construction, respectively comprising a heater band 2, with a socket contact plug 9 connected at one end thereof and a pin contact plug 10 connected at the other end thereof. The respective heating conductor arrangements 1 and 12 can be connected together in series by plugging together the two plugs 9 and 10 to form a coupling region 41. Since the heating conductor arrangements each have the same construction, they represent modular components that can easily be interconnected to form any needed length of the overall heating system.

Figure 2:
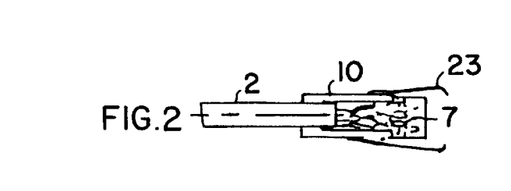
FIG. 2 shows an individual pin contact plug permanently connected to a heater band or cable, in a first heating conductor arrangement.
Figure 3:
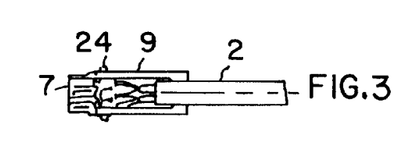
FIG. 3 shows an individual socket contact plug permanently connected to a heater band or cable of a second heating conductor arrangement.
Figure 5:
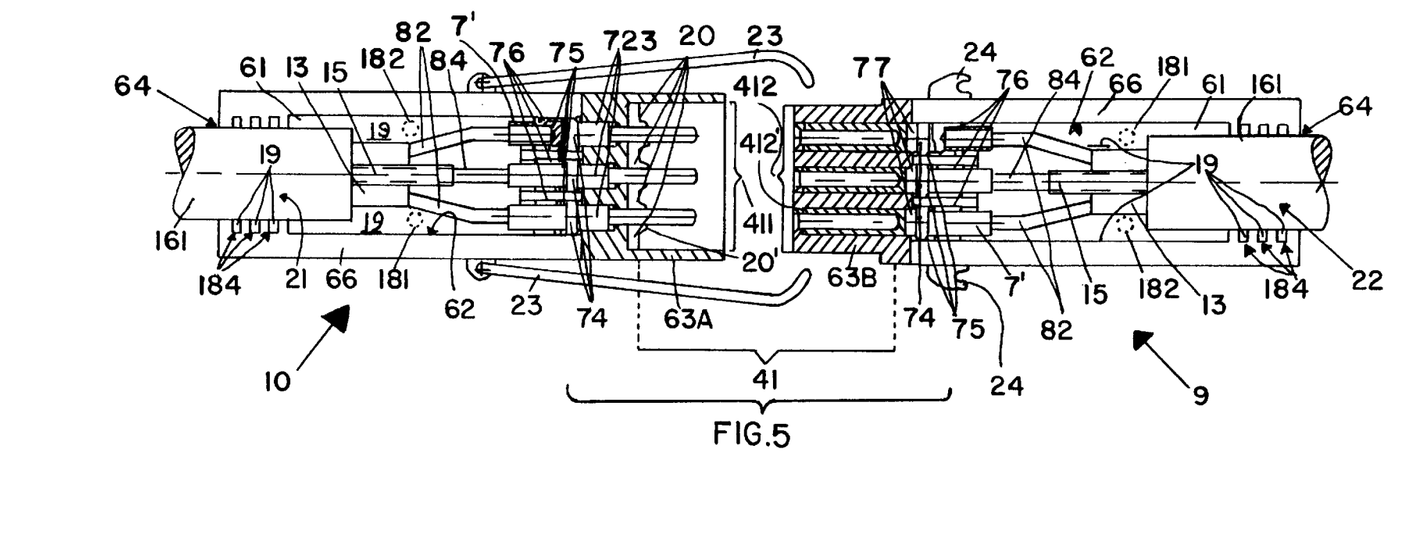
FIG. 5 is an enlarged detail view of the pin contact plug and the socket contact plug in a state as they are being coupled together.
Figure 6:
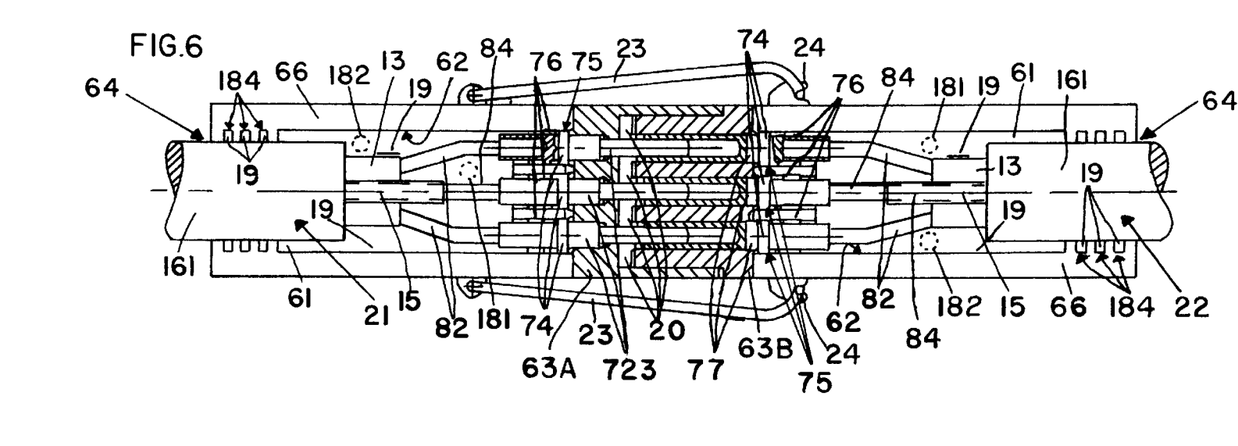
FIG. 6 is an enlarged detail view corresponding to FIG. 4, showing the pin contact plug and the socket contact plug electrically coupled and mechanically locked together.

As shown generally in FIGS. 2, 3 and 4, and with more detail in FIGS. 5 and 6, each of the contact plugs 9 and 10 comprises respective electrical connecting elements 7 connected to the ends of the conductors of the heater band 2 within a housing 6. The pin contact plug 10 of the first heating conductor arrangement 1 can be inserted and plugged into the socket contact plug 9 of the second heating conductor arrangement 12, whereby the respective mating and aligning connecting elements 7 of the two plugs become electrically coupled to one another. Furthermore, each pin contact plug 10 includes a mechanical locking bail 23, while each socket contact plug 9 includes retaining or catch elements 24, whereby the two plugs can be mechanically locked together by engaging the locking bails 23 onto the retaining catches 24. This mechanical locking prophylactically prevents an unintentional disconnection or loosening of the electrical coupling provided by the respective connected connecting elements 7 of the two plugs, as a result of vibrations or shocks or other mechanical effects that could possibly be effective on the serially interconnected heating conductor arrangements when they are installed in an aircraft or the like.

As shown in further detail with reference to FIGS. 5 and 6, each of the socket and pin contact plugs 9 and 10 respectively comprises an electrical connection housing 6, which is formed of or comprises an open housing underpart 66 with a hollow inner chamber 61 therein, and a housing cover or lid that is not shown, but that may be an essentially flat plate or a three-dimensionally formed cover member including a hollow space coinciding with the hollow inner chamber 61 of the housing underpart 66. In order to form the overall closed and sealed housing 6, the housing cover is secured and sealed onto the housing underpart 66 in a force- and/or form-locking manner, after the electrical connections of the conductors of the heater bands 2 with the connecting elements 7 have been carried out within the open inner chamber 61 of the housing underpart 66, as will be described below.

The components of the housing 6 preferably comprise a non-conducting plastic material, whereby advantageously the two components can be secured and sealed together by means of high frequency plastic welding, for example carried out by ultrasonic welding. Alternatively, a mechanically tightly sealed arrangement can be achieved by clamping together the two housing components, or by laying the housing cover tightly on the free edge or rim of the housing wall of the housing underpart 66 and then securing the cover in place by means of screws. The overall outer shape of the housing 6 is a substantially parallelepiped or quadratic block shape, whereby a housing lead-in opening 64 is formed in one end face of the housing underpart 66 on an end thereof opposite the connection end provided with the connecting elements 7. This housing lead-in opening 64 receives the heater band 2 extending therethrough.

As shown especially in FIG. 5, the housing underpart 66 of each contact plug 9 or 10 comprises a massive housing end block 63, at one end thereof, whereby the pin contact plug 10 includes a female end block 63A with a female plug cavity 411 therein, and the socket contact plug 9 includes a male end block 63B with a male guide part 412 configured to matingly fit into the cavity 411 of the female end block 63A. Three respective contact chambers extending parallel to the lengthwise axis of the housing underpart 66 and laterally spaced apart from one another are formed or machined into each housing end block 63 of each plug 9 or 10. On the end of each block 9 or 10 opposite the massive end block 63, a housing end is formed by a part of the housing wall, in which the lead-in opening 64 is provided. The heater band 2 extends through this lead-in opening 64 into the inner chamber 61 within the housing underpart 66. In the special case of the first heating conductor arrangement in a chain, a plurality of lead-in openings 64 may be provided, whereby the individual plural conductors of the on-board power supply network or of an extension cable connected thereto, are extended through these plural lead-in openings into the inner chamber 61.

In the pin contact plug 10, each connecting element 7 respectively includes a crimpable connection portion or crimpable sleeve 7' and a pin contact 723, with a tying band or collar 74 therebetween. As seen in FIGS. 5 and 6, the crimpable connection portion 7' has an axially directed blind connection hole therein, which is closed at its blind end by the tying band or collar 74 such that the connecting element 7 does not include an axially through-going hole, so as to avoid the formation of a liquid-conveying capillary extending entirely axially through the connecting element. In the present example embodiment, there are three respective connecting elements 7 including three crimpable portions 7' received in three receiving grooves 75, and three pin contacts 723 received in three corresponding contact chambers.

More specifically, the crimpable connection portion 7' of each connecting element is connected to the conductors of the first heater band 21 as will be discussed further below. The crimpable portion 7' extends at least partially into the inner chamber 61 formed within the housing underpart 66. The crimpable portion 7' or the central body portion of each connecting element 7 is received in a corresponding receiving groove 75 formed to extend parallel to the lengthwise direction within the housing underpart 66, while the collar 74 of each connecting element 7 is received in a respective crosswise groove that is formed in the housing underpart 66 to extend perpendicularly to and intersect the respective receiving groove 75. Moreover, the respective collars 74 are arranged just inside of the inner chamber 61 adjacent the wall of the massive housing end block 63, while a retaining ring or clip 76 secures each respective collar 74 in the respective receiving groove 75.

At the other end of the respective connecting elements 7, the pin contacts 723 extend through the individual contact chambers formed in the massive housing end block 63. The outer diameter or circumference of each pin contact 723 is fitted to the corresponding dimension of the individual contact chamber. The length and arrangement of the pin contacts 723 is such that they extend through the contact chambers and reach into the female cavity or guide region 411 of the plug 10. At the location where each pin contact 723 exits from the respective contact chamber and protrudes into the female cavity or guide region 411, this area is sealed by means of a seal element 20, such as a rubber or elastomeric disk with respective holes therein, through which the pin contacts 723 extend. Furthermore, the seal element 20 includes a conical seal protrusion 20' surrounding and sealing around each pin contact 723.

The structural arrangement of the socket contact plug 9 is generally similar to that of the pin contact plug 10, so that most of the description applies similarly to both types of plugs, with certain differences as follows. The housing 6 of the socket contact plug 9 is substantially similar to that of the pin contact plug 10, except for a different configuration of the housing end block 63 as has been described above. The three connecting elements 7 of the socket contact plug 9 respectively include a crimpable connection portion 7' at one end, a socket contact 77 (rather than a pin contact), and a collar 74 therebetween. Similarly as described above with regard to the pin contact plug 10, the connecting elements 7 of the socket contact plug 9 thus each have an axially directed blind connection hole, and do not include an axially through-going hole, so as to avoid the formation of a liquid-conveying capillary extending entirely axially through the connecting element. The socket contacts 77 are respectively fittingly received in contact chambers formed in the massive end block 63B, while the crimpable portions 7' and collars 74 are received in respective grooves and secured by retaining clips as described above for the pin contact plug 10.

The respective socket contacts 77 extend through the end block 63B almost entirely to its outer surface, i.e. almost flush with the end surface that faces and plugs into the pin contact plug 10. A respective conical recess 412' is formed at the end of each contact chamber to transition from the socket contact 77 to the end face of the male guiding region or portion 412 of the end block 63B. The smaller diameter of each conical recess 412' corresponds to the inner diameter of the respective socket contacts 77, while the outer diameter of the respective conical recess 412' transitions into the flat end wall of the end block 63B and forms a pin guide or lead-in recess for conveniently directing the contact pins 723 into the socket contacts 77.

The massive end block 63B of the socket contact plug 9 is formed as a male plug or interconnection guide region 412 configured to fittingly engage into the female cavity 411 of the pin contact plug 10. Thus, when the two plugs 9 and 10 are plugged together, the male plug or guide region 412 plugs into the female cavity 411, while the pin contacts 723 extend and engage into the socket contacts 77. In this manner, the electrical coupling region 41 is formed by the overlapping engagement of the socket and pin contact plugs 9 and 10 over the respective engaging guide regions 411 and 412. The conical seal protrusions 20' of the interface seal element 20 arranged sealingly around the pin contacts 723 within the female cavity 411 of the pin contact plug 10 sealingly engage into the respective conical recesses 412' in the end face of the male member 412 of the socket contact plug 9 when the two plugs 9 and 10 are engaged together. The interface seal disk 20 itself sealingly presses against the flat end face of the male member 412 of the end block 63B of the plug 9, so as to form an effective seal against moisture penetration into the plug interconnection region 41 once the two plugs are coupled together. This engaged condition is shown in FIG. 6.

In this coupled state, the respective pin contacts 723 of the plug 10 respectively engage into and come into electrical interconnection with the respective socket contacts 77 of the plug 9, while the male guide member 412 of the plug 9 achieves a mechanically fitting interconnection in the female cavity 411 of the plug 10. This interconnected state of the plugs 9 and 10 may further be positively locked as follows. One or more locking bails 23 may be rotatably provided on the housing 6 of one of the plugs, and in the illustrated embodiment particularly on the pin contact plug 10. A hook-shaped or nose-shaped retaining element or catch 24 adapted for receiving and engaging the locking bail 23 is provided on the opposite plug 9. Once the two plugs have been pushed together, the two locking bails 23 may be manually snapped into position over the retaining catches 24, under some tension to poBitively press the two plugs together.

The two-sided symmetrical arrangement of the locking bails 23 avoids any non-uniform or one-sided mechanical loading of the interconnected plugs 9 and 10, and further ensures that a uniform pressing force and resulting compression is applied to the interface seal member 20 that is sealingly squeezed between the male member 412 of the end block 63B of the plug 9 and the female cavity 411 of the end block 63A of the plug 10.

The details of how the pin contact plug 10 and the socket contact plug 9 are respectively fitted onto the ends of the respective heater bands 21 or 22, by connecting the conductors of the heater bands to the connecting elements 7 in the plugs, will now be described. The same connecting technique applies to both types of plugs 9 and 10. Of course, these connections are performed in fabricating the individual heating conductor arrangements 1 and 12, before carrying out the above described plug-in interconnection of several heating conductor arrangements with each other.

First, the respective heater band 21 or 22 (generally 2) is directed through the housing lead-in opening 64 into the inner chamber 61 of the housing underpart 66 of the respective contact plug. The housing lead-in opening 64 may be provided with one or more lateral recesses or grooves 184 encircling the heater band 2, whereby these recesses or grooves 184 will be filled with adhesive sealing compound 19 in the final assembled condition of the respective plug as described below. The heater band 2 is properly positioned, with regard to its length, in the inner chamber 61 so that its respective electrical conductors can be easily connected by being crimped into the respective crimpable sleeves 7' of the connecting elements 7. It should be noted that the crimped connection of the respective electrical conductors to the respective connecting elements 7 can be carried out already before the end of the heater band 2 is inserted into the housing 6 through the housing lead-in opening. In that case, it is then simply necessary to arrange the connecting elements 7 in the receiving grooves 75, and push the pin contacts 723 or socket contacts 77 into the respective contact chambers formed in the end block 63 as the heater band 2 is inserted through the lead-in opening.

The non-offset or non-stripped end portion of the heater band 2 is stripped or de-insulated using any known technique, in order to expose the electrical conductors of the heater band 2. In this embodiment, the heater band 2 is a self-limiting parallel heater band in which two conductors 82 carry the normal operating current, while a braided co-axial protective conductor 84 does not normally carry a current during operation of the heater. In this context, an end portion of the outer sheath 161 that jackets and encloses the outside of the heater band 2 is removed or cut back, and the braided protective conductor 84 is exposed. Next, the current carrying conductors 82 are respectively exposed by removing the inner sheath 13 that covers them. Also, at this stage or initially, the heater element 2 may be cut or shortened to the required length for the installation. The exposed strands of the braided protective conductor 84 are combed out and twisted together in such a manner that the twisted end may then be connected to the crimpable connection portion 7' of one of the connecting elements 7 without problems.

Next, this transition or connection zone is coated and surrounded with an adhesive potting compound 19, and a shrinkable tube 15 is (optionally but not necessarily) shrunk onto the braided protective conductor at least at a partial area over or around the inner sheath 13 so as to seal and electrically insulate this transition area. In this condition, the so-called off-set or stepped-down portion, i.e. the stripped or de-insulated portion, of the heater band 2 is located in the open inner chamber 61 of the housing underpart 66 of the connection housing 6, whereby the respective conductors 84 and 82 of the heater band 2 have individually been crimp-connected to the crimpable connection zone 7 of the three respective connecting elements 7 protruding into the inner chamber 61. The protective conductor 84 is preferably arranged centrally along the axis of the plug, and the two current-carrying conductors 82 are arranged laterally outwardly adjacent the conductor 84 in the inner chamber.

After the above electrical connections between the conductors of the heater bands 2 and the respective connecting elements 7 have carried out, the connection areas are sealed as follows. An adhesive potting compound 19 is applied completely over and around at least the crimpable connection portion 7' of each connecting element 7, to which the respective ends of the conductors of the heater band have been crimp-connected. Furthermore, the central or body portion of each connecting element 7 arranged in the receiving groove 75 is also at least partially coated with the adhesive potting compound 19, and also the stripped or offset portion of the heater band 2 as well as the remaining portion of the outer sheath 161 of the heater band 2 protruding into the inner chamber 61 of the housing 6 are also coated from all sides with the adhesive potting compound 19. In the special case of the first connection end of the first heating conductor arrangement, wherein the conductors of the on-board power supply network or respective extension cable conductors are connected in the connection housing 6, these respective conductors would be coated with the adhesive potting compound 19. In this manner, the exposed conductor portions and the connection areas are completely sealed against the penetration of moisture and liquid, even under conditions of extreme low pressure, in order to ensure that the sealing requirements are met.

Next, the entire inner chamber 61 of the housing 6 is filled with the adhesive potting compound 19. This can be achieved simply by pouring the potting compound 19 into the housing underpart 66 after the electrical connections have been made, but before the housing cover has been secured on the housing underpart 66. At the same time, the recesses or grooves 184 formed around the heater band 2 in or adjacent the housing lead-in opening 64 are also filled with the adhesive potting compound 19, in order to provide an additional seal against the penetration of moisture and liquid at this location. Next, the housing cover is welded, screwed, or secured by a clamping bail onto the housing underpart 66, and then the potting compound 19 is caused to cure and harden.

As an alternative, the housing underpart 66 may have at least one filling hole 181 and at least one venting hole 182 passing through the housing wall thereof. In this case, the housing cover may be secured and sealed onto the housing underpart 66 before filling the housing with the adhesive potting compound 19. After the housing is closed, the adhesive potting compound 19 is injected into the filling hole 181 so as to completely fill the inner chamber 61, and completely seal all of the electrical connections and components within the housing, and all of the hollow space bounded within the inner housing wall 62. Once the potting compound 19 exits continuously, and preferably without bubbles, from the venting hole 182, this indicates that the inner chamber 61 has been completely filled and all of the electrical connections have been completely surrounded and sealed with the potting compound 19, without enclosing any air pockets therein. At this time, the injection of the potting compound 19 is discontinued, and the potting compound 19 in the housing 6 is then allowed to cure and harden.

In any of the above embodiments, the housing cover could extend only over the portion of the housing underpart 66 having the hollow inner chamber 61 therein, while, for example, the massive end blocks 63 are not covered or overlapped by the housing cover. In such an embodiment, the massive end blocks 63 have a greater height than the walls of the housing underpart 66 (wherein this "height" is understood to extend perpendicularly to the plane of the drawing figures), and the contact chambers therein are circular bored holes. Alternatively, the housing cover could extend along the entire length of the respective housing underpart 66, so as to also cover the massive end blocks 63. In this case, the contact chambers may be respective grooves in the end blocks 63 having an open side facing and covered by the housing cover.

The crimp connections described herein involve a so-called permanent or non-removable electrical connection of stripped or exposed ends of the respective electrical conductors. On the other hand, the pin and socket contacts provide removable or temporary electrical connections. As used herein, the terms "permanent" and "non-removable" relate to connections that can only be taken apart using tools, whereby the connection becomes damaged or is not directly re-connectable. On the other hand, "temporary" and "removable" relate to connections that can be disconnected and reconnected as desired, either by hand or using appropriate tools, without damaging the connectors or rendering the connectors unreusable.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A heater system comprising first and second heater units electrically and mechanically coupled to each other, wherein said first heater unit comprises a first heater band and a first pin contact plug connected to an end of said first heater band, said second heater unit comprises a second heater band and a second socket contact plug connected to an end of said second heater band, said first pin contact plug and said second socket contact plug are configured and adapted to be matingly coupled to each other and mechanically locked together to provide said electrical and mechanical coupling of said first and second heater units, each one of said contact plugs respectively comprises a housing with an inner chamber therein and at least one lead-in opening passing through said housing into said inner chamber, at least one electrical connector element including a connection portion arranged in a receiving groove provided within said housing, and a sealing compound filling a hollow space in said inner chamber, each said heater band comprises at least one heating conductor and an outer sheath jacketing said heating conductor except for at least one exposed connection end of said heating conductor, said heater band including said outer sheath passes through said lead-in opening so that said exposed connection end of said heating conductor is located in said inner chamber in said housing, and said exposed connection end is connected to said connection portion of said electrical connector element, and said sealing compound in said inner chamber surrounds and seals at least one connection area at which said exposed connection end is connected to said connection portion of said electrical connector element, any portion of said electrical connector element protruding from said receiving groove into said inner chamber in said housing, and any portion of said heater band within said inner chamber.

2. The heater system according to claim 1, wherein said first heater unit further comprises a first socket contact plug connected to an opposite end of said first heater band opposite said first pin contact plug, said second heater unit further comprises a second pin contact plug connected to an opposite end of said second heater band opposite said second socket contact plug, said heater system further comprises additional ones of said heater units which each respectively comprise an additional heater band with an additional pin contact plug connected to an end thereof and an additional socket contact plug connected to an opposite end thereof, and all of said socket contact plugs have the same socket contact plug configuration, and all of said pin contact plugs have the same pin contact plug configuration, such that said heater system is a modular system wherein each one of said heater units may be electrically and mechanically coupled to any other one of said heater units by matingly coupling any one of said pin contact plugs with any one of said socket contact plugs.

3. The heater system according to claim 1, wherein said sealing compound completely seals said housing and said connection area against penetration of moisture even under low pressure conditions less than atmospheric pressure.

4. The heater system according to claim 1, wherein said connection portion of said electrical connector element is a crimpable connection portion that is crimped onto said exposed connection end of said heating conductor.

5. The heater system according to claim 1, wherein said housing of each one of said contact plugs further has at least one recess groove in said lead-in opening around said heater band, and said recess groove is filled with said sealing compound.

6. The heater system according to claim 1, wherein one of said pin contact plug and said socket contact plug further comprises a locking element pivotably connected to said housing thereof, and the other of said pin contact plug and said socket contact plug further comprises a retaining catch, wherein said locking element and said retaining catch are so configured and arranged that said locking element can be pivoted into and retained in engagement with said retaining catch when said pin contact plug and said socket contact plug are matingly coupled to each other.

7. The system according to claim 1, wherein said electrical connector element includes at least one axially directed blind connection hole therein, and does not include an axially through-going hole, so as to avoid the formation of a liquid-conveying capillary extending entirely axially through said electrical connector element.

8. The heater system according to claim 1, wherein said heating conductor of each one of said heater bands is a current-carrying conductor that conducts an operating current during operation of said heater band, each said heater band further comprises an inner insulating sheath jacketing said current-carrying conductor and a protective conductor that does not carry a current during normal operation of said heater band and that comprises braided electrically conducting wire strands arranged outwardly around said inner insulating sheath, and said outer sheath is an outer insulating sheath arranged outwardly around said protective conductor.

9. The heater system according to claim 1, wherein each said heater band is a resistance heater band that includes only a single resistive heating conductor as said at least one heating conductor.

10. The heater system according to claim 1, wherein each said heater band is a parallel heater band wherein said at least one heating conductor includes at least two heating conductors.

11. The heater system according to claim 1, wherein each said heater band has a flat cross-sectional shape.

12. The heater system according to claim 1, wherein each said heater band has a round cross-sectional shape.

13. The heater system according to claim 1, wherein each said heater band is a self-limiting heater band adapted to operate in a specified limited temperature range.

14. A combination comprising an aircraft and the heater system according to claim 1 installed in said aircraft, wherein said aircraft includes a fuselage and a liquid-conveying pipe system arranged in said fuselage, and wherein said heater bands are arranged and secured on said pipe system of said aircraft.

15. The heater system according to claim 1, wherein each said heater band comprises a total of at least three parallel conductors including said heating conductor.

16. The heater system according to claim 1, wherein said housing of each one of said contact plugs further has at least one contact chamber passing through said housing into said inner chamber opposite said lead-in opening, said electrical connector element of said pin contact plug further includes a pin contact connected to said connection portion and extending out of said housing through said contact chamber of said pin contact plug, and said electrical connector element of said socket contact plug further includes a socket contact connected to said connection portion and extending and arranged in said contact chamber of said socket contact plug.

17. The heater system according to claim 16, wherein each one of said contact plugs comprises a respective plurality of said electrical connector elements and a respective plurality of said contact chambers, each one of said electrical connector elements extends parallel to a lengthwise axis of said housing of said contact plug, and said electrical connector elements are arranged laterally adjacent and spaced apart from one another.

18. The heater system according to claim 16, wherein said housing of said pin contact plug includes a female plug cavity open to the outside of said housing at an end thereof opposite said lead-in opening, said contact chamber of said pin contact plug passes from said inner chamber to said female plug cavity, said pin contact protrudes from said contact chamber into said female plug cavity, and said pin contact plug further comprises a seal element arranged in said female plug cavity with said pin contact passing through said seal element.

19. The heater system according to claim 18, wherein said housing of said socket contact plug includes a male plug protrusion protruding outwardly from said housing at an end thereof opposite said lead-in opening, said contact chamber of said socket contact plug passes from said inner chamber through said male plug protrusion out of said housing, said male plug protrusion is configured and adapted to be fittingly received in said female plug cavity while said pin contact is received in and electrically coupled with said socket contact.

20. The heater system according to claim 19, wherein said seal element comprises an elastomeric disk with a conical seal protrusion around said pin contact, said male plug protrusion has an end face with a conical recess therein adjoining and transitioning into said contact chamber, and said conical recess and said conical seal protrusion are respectively so configured and arranged such that said conical seal protrusion sealingly presses into said conical recess when said male plug protrusion is fittingly received in said female plug cavity.

21. The heater system according to claim 1, wherein said housing of each one of said contact plugs includes a housing wall and a massive end block at an end of said housing opposite said lead-in opening, said end block has a thickness greater than said housing wall, and said end block has a plurality of contact chambers respectively extending axially therethrough.

22. The heater system according to claim 21, wherein
    said connection portion of each said electrical connector element comprises a crimpable connection portion that is crimped onto said exposed connection end of said heating conductor,
    said electrical connector element of said pin contact plug further includes a pin contact connected to said connection portion and a collar arranged therebetween, with said connection portion at least partially extending into said inner chamber and said pin contact extending out of said housing through one of said contact chambers,
    said electrical connector element of said socket contact plug further includes a socket contact connected to said connection portion and a collar arranged therebetween, with said connection portion at least partially extending into said inner chamber and said socket contact extending into and at least partially through one of said contact chambers, and
    each said contact plug further comprises a respective retaining clip secured around said collar of each said electrical connector element to secure said electrical connector element in said housing.

23. The heater system according to claim 1, wherein said connection portion comprises a crimpable connection sleeve that is crimped onto said exposed connection end of said heating conductor and that is at least partially surrounded by said sealing compound.

24. The heater system according to claim 23, wherein said crimpable connection sleeve includes a protruding portion that protrudes from said receiving groove into said inner chamber, and said protruding portion is surrounded by sealing compound.

25. The heater system according to claim 24, wherein said housing comprises a housing underpart and a housing cover that is securely connected to said housing underpart, and said lead-in opening and said receiving groove are formed in said housing underpart.

26. The heater system according to claim 25, wherein
    said housing underpart of each one of said contact plugs includes a housing wall and a massive end block at an end of said housing underpart opposite said lead-in opening,
    said end block has a thickness greater than said housing wall and has a plurality of contact chambers respectively extending axially therethrough,
    said housing cover has an axial length equal to that of said housing underpart,
    said contact chambers comprise open grooves formed in said end block, and
    said housing cover is arranged and welded onto said housing underpart so as to cover and close said inner chamber, overlap said end block, and cover and close said open grooves of said contact chambers.

27. The heater system according to claim 1, wherein said sealing compound is an adhesive sealant that is adhesive, sealing, thermally insulating, and electrically insulating.

28. The heater system according to claim 27, wherein said housing is made of a plastic, and said sealing compound is a two-component, organic polymeric, pourable or injectable and then curable, potting compound comprising at least one of epoxies and polyamides, that is poured or injected into said housing and then cured therein.

29. The heater system according to claim 28, wherein said sealing compound is based on a combination of an epoxy and a polyamide.

30. The heater system according to claim 1, wherein said first heater band comprises two heater band sections and an intermediate connection module respectively arranged between, connected to and interconnecting said heater band sections to form said first heater band.

31. The heater system according to claim 30, wherein said intermediate connection module comprises another one of said pin contact plugs connected to one of said heater band sections, and another one of said socket contact plugs connected to the other of said heater band sections, wherein said another pin contact plug and said another socket contact plug are plugged together to form said intermediate connection module interconnecting said heater band sections.

* * * * *

UNITED STATES PATENT AND TRADEMARK OFFICE
CERTIFICATE OF CORRECTION

PATENT NO. : 6,126,483
DATED : October 3, 2000
INVENTOR(S) : Kirma et al.

It is certified that error appears in the above-identified patent and that said Letters Patent is hereby corrected as shown below:

On the Title Page: under [56], References Cited
    FOREIGN PATENT DOCUMENTS
       line 4, before 5/1985, replace "04019" by –G85 04019.3–;
       line 5, before 6/1985, replace "03674" by –G85 03674.9–;

Col. 10, line 16, before "press", replace "poBitively" by –positively–;

Col. 11, line 29, after "have", insert --been--.

Signed and Sealed this

First Day of May, 2001

Attest:

NICHOLAS P. GODICI

*Attesting Officer*    *Acting Director of the United States Patent and Trademark Office*